(12) United States Patent
Block et al.

(10) Patent No.: US 6,192,417 B1
(45) Date of Patent: Feb. 20, 2001

(54) MULTICAST CLUSTER SERVICER FOR COMMUNICATING AMONGST A PLURALITY OF NODES WITHOUT A DEDICATED LOCAL AREA NETWORK

(75) Inventors: Timothy Roy Block; Bob Richard Cernohous, both of Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/280,469

(22) Filed: Mar. 30, 1999

(51) Int. Cl.[7] .............................. G06F 15/16; H04L 12/28
(52) U.S. Cl. ........................ 709/249; 709/227; 370/390; 370/408
(58) Field of Search .................................. 709/249, 227; 370/408, 390

(56) References Cited

U.S. PATENT DOCUMENTS

| | | | |
|---|---|---|---|
| 5,079,767 | * | 1/1992 | Perlman ............................. 370/408 |
| 5,361,256 | * | 11/1994 | Doeringer et al. .................. 370/390 |
| 5,778,187 | * | 7/1998 | Monteiro et al. ................... 709/231 |
| 5,835,723 | * | 11/1998 | Andrews et al. .................... 709/226 |
| 5,850,396 | * | 12/1998 | Gilbert .............................. 370/390 |
| 6,047,323 | * | 4/2000 | Krause .............................. 709/227 |

* cited by examiner

Primary Examiner—Krisna Lim
(74) Attorney, Agent, or Firm—Schmeiser, Olsen & Watts

(57) ABSTRACT

According to the present invention, a cluster communications system is provided that supports reliable and efficient cluster communications. The preferred embodiment cluster communication systems can be used to provide this reliable and efficient cluster communication for cluster configurations extending beyond a single local area network (LAN). The cluster communications system provides reliable and efficient cluster communication by facilitating multicast messaging between systems in the cluster. In particular, the preferred embodiment provides for the establishment of multicast groups in between which multicast messaging is provided. The preferred embodiment provides this multicasting while providing the needed mechanisms to assure ordered message delivery between systems. The preferred embodiment extends this efficient and reliable cluster communication by providing for additional point-to-point communication between systems not on the same LAN. Thus, the preferred embodiment provides a cluster communication system that uses reliable multicasting for efficient cluster communication in a way that can be used for clusters that extend beyond a single local area network.

56 Claims, 6 Drawing Sheets

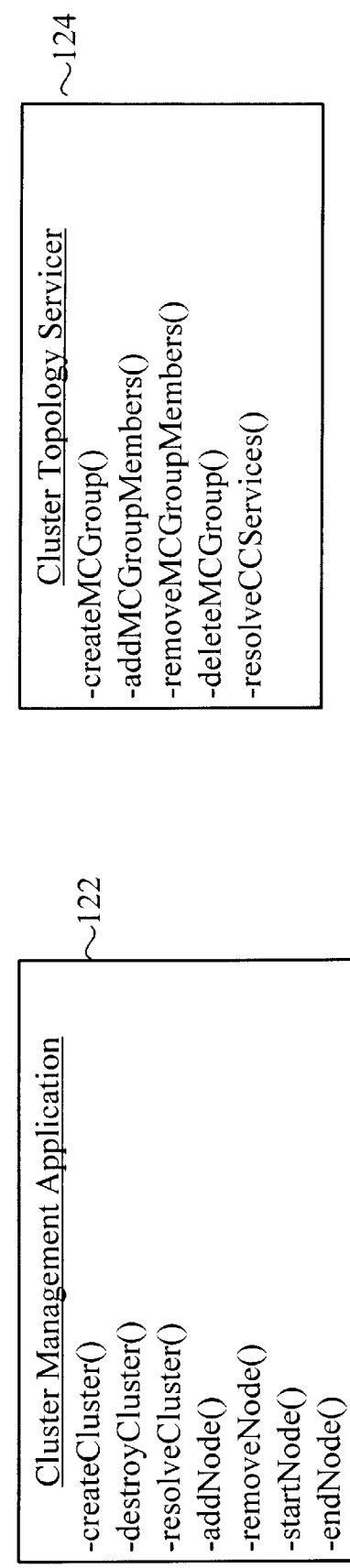

MULTICAST CLUSTER SERVICER FOR COMMUNICATING AMONGST A PLURALITY OF NODES WITHOUT A DEDICATED LOCAL AREA NETWORK

RELATED APPLICATIONS

This application is related to the following U.S. patent application: "Cluster Destination Address Table-IP Routing for Clusters", Docket No. R0998-088, U.S. Patent Application Ser. No. 09/173,090, filed on Oct. 15, 1998.

BACKGROUND OF THE INVENTION

1. Technical Field

This invention generally relates to clustering computers, and more specifically relates to communications infrastructures for use on computer system clusters.

2. Background Art

Society depends upon computer systems for many types of information in this electronic age. Based upon various combinations of hardware (e.g., semiconductors, circuit boards, etc.) and software (e.g., computer programs), computer systems vary widely in design. Many computer systems today are designed to "network" with other computer systems. Through networking, a single computer system can access information stored on and processed by other computer systems. Thus, networking results in greater numbers of computer systems having access to greater numbers of electronic resources.

Networking is made possible by physical "routes" between computer systems, and the use of agreed upon communications "protocols." What protocol is chosen depends upon factors including the number of networked computer systems, the distances separating the computer systems, and the purposes of information exchange between the computer systems. Communications protocols can be very simplistic if only a few computer systems are networked together at close proximity. However, communications protocols become more sophisticated as greater numbers of computer systems are added, and as computer systems are separated by greater distances.

The sophistication of communications protocols also varies with the type of information exchange. For instance, some protocols emphasize accuracy in sending large amounts of information, while others emphasize the speed of information transfer. The communications requirements of the applications running on a computer system network determine what type of protocol is chosen. An example of a computer application requiring real-time, reliable information transfer is a "cluster" management application.

Clustering is the networking of computer systems for the purpose of providing continuous resource availability and for sharing workload. A cluster of computer systems appears as one computer system from a computer system user's perspective, but actually is a network of computer systems backing each other up. In the event of an overload or failure on one computer system in a cluster, cluster management applications automatically reassign processing responsibilities for the failing computer system to another computer system in the cluster. Thus, from a user's perspective there is no interruption in the availability of resources.

Clustering is made possible through cluster management application programs running on each computer system in a cluster. These applications relay cluster messages back and forth across the cluster network to control cluster activities. For instance, each computer system in a cluster continuously monitors each of the other computer systems in the same cluster to ensure that each is alive and performing the processing assigned to it. Cluster messaging is also used to distribute updates about which computer systems in the cluster have what primary and back-up responsibilities. Because of the high volume of messages needed to support a cluster, communications protocols employed for cluster messaging must support high speed, real-time, reliable information transfer.

Unfortunately, existing protocols that provide the real-time, reliable information transfer required to support cluster communications have many limitations. For example, they are typically designed for networks located within a single localized area, also called local area networks (LAN's). Clusters of computer systems that use these existing protocols have correspondingly been limited to a network contained within a localized area. Therefore, a key limitation to the clustering of computer systems is that the cluster configuration is limited to one individual LAN. Furthermore, protocols such as TCP/IP that do support wide area networking do not have the required combination of reliability, speed, and efficiency necessary to effectively provide group communications between computer systems in a cluster.

As more resources become accessible across computer system networks, the demand for continuous access to such network resources will grow. The demand for clusters as a means to provide continuous availability to such network resources will grow correspondingly. Without a reliable, fast and efficient way to communicate between complex clusters of computer systems, continuous availability of network resources will not be fully realized.

DISCLOSURE OF INVENTION

According to the present invention, a cluster communications system is provided that supports reliable and efficient cluster communications. The cluster communication system of the preferred embodiment can be used to provide this reliable and efficient cluster communication for cluster configurations extending beyond a single local area network (LAN). The cluster communications system provides reliable and efficient cluster communication by facilitating multicast messaging between systems in the cluster. In particular, the preferred embodiment provides for the establishment of multicast groups in between which multicast messaging is provided where possible. The preferred embodiment provides this multicasting while providing the needed mechanisms to assure ordered message delivery between systems. The preferred embodiment extends this efficient and reliable cluster communication by providing for point-to-point communication to relay nodes on systems not on the same LAN, where the relay nodes can then multicast to other members of the multicast group on its LAN. Thus, the preferred embodiment provides a cluster communication system that uses reliable multicasting where possible for efficient cluster communication in a way that can be used for clusters that extend beyond a single local area network.

The preferred embodiment provides this efficient cluster communication beyond a single LAN by building and extending upon the proven Internet Protocol and User Datagram Protocol. This provides a great level of reliability and efficiency while maximizing interoperability between other IP based systems.

The foregoing and other features and advantages of the invention will be apparent from the following more particular description as set forth in the preferred embodiments of the invention, and as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 3 is a schematic view of a cluster management application in accordance with the preferred embodiment of the present invention;

FIG. 4 is a schematic view of a cluster topology servicer in accordance with the preferred embodiment of the present invention;

BEST MODE FOR CARRYING OUT THE INVENTION

Figure 1:
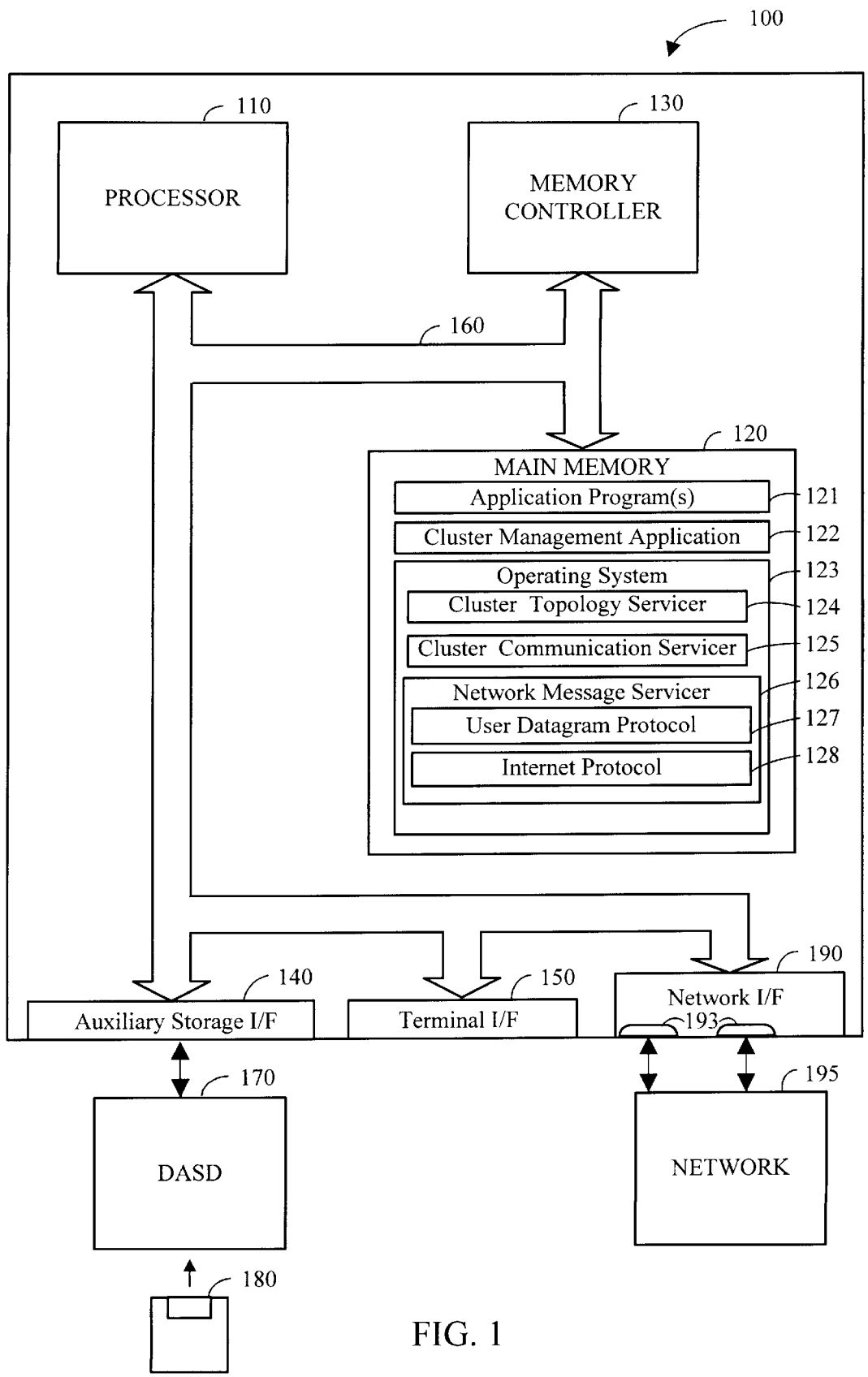
FIG. 1 is a block diagram of an apparatus according to a preferred embodiment of the present invention.

The present invention relates to cluster communications. The present invention is preferably implemented using object oriented techniques to build upon and extend the Internet Protocol (IP) and User Datagram Protocol (UDP) to provide reliable and efficient cluster communication for cluster configurations extending beyond a single local area network (LAN). In particular, the preferred cluster communications system provides reliable and efficient cluster communication by facilitating multicast messaging between systems in the cluster. For those individuals who are not generally familiar with the concepts of object oriented programming, clustering, the User Datagram Protocol and the Internet Protocol the Overview section below presents many of the basic concepts and terminology that will help the reader to understand the preferred embodiment of the present invention. Individuals skilled in the art of clustering, object oriented programming and Internet routing protocols may skip the Overview and proceed directly to the Detailed Description of this specification.

1. Overview

Object-Oriented Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and Java are all examples of languages that support object-oriented programming to one degree or another.

Clustering

Clustering is the linking together of computers, or groups of computers, in a way that allows the computers to share work and act as back ups for each other. As such a cluster allows a computer system to continue to operate and provide services even if one or more of its computers in the cluster fails. For the computer user's perspective, the cluster of computer systems appears as one computer system. Clustering is transparent to the users of computer clusters, who need not be aware of whether they are using one computer system or multiple computer systems. Instead, what matters to the users of computer clusters is that they have access to the resources they need, such as databases, printers, files, etc. By clustering computer systems together, continuous availability to necessary resources can be achieved.

There are numerous advantages to clustering computer systems together. First, and most important, clusters provide higher availability by allowing computer systems within a cluster to back each other up. Second, clustering increases scalability, by allowing additional computer systems to be added as needed to improve processing power. Third, workloads can be balanced between computer systems in a cluster.

The computer systems that make up a cluster are also called "nodes." Technically, the term node can refer to processors, communications controllers, or terminals. However for the purposes of a cluster, a node refers to one of the individual computer systems in a cluster. Typically each node in a cluster is assigned primary and backup responsibilities in support of the cluster. Assigned responsibilities may be for one or for multiple functions such as providing access to data, performing computer applications, or providing access to hardware resources, as in printers, scanners, or fax machines. The nodes in the cluster communicate to ensure that all nodes are functioning, that clustering software on each node is alive and actively monitoring for conditions that would require a switch from primary to backup. Such basic cluster functions are termed "heart beating," that is, low level messaging going between each node to make sure each is alive and healthy.

Primary nodes may be unable to perform their assigned cluster functions because they are taken off-line for administrative or maintenance reasons. Alternatively, a primary node may fail and be unable to perform its functions. In either case, when a node assigned primary responsibility for an assigned function is unable to perform, cluster management applications must act to ensure that the cluster user still has access to the resources assigned to the node that is unable to perform. At a point when one of the nodes does not report back, other nodes are alerted and queried as to their perspective of the silent node. The nodes work together to reach a consensus that it is time to kick out the silent node and transfer its primary responsibilities over to backup nodes. In this manner, the cluster user still has access to needed resources, even when the computer system primarily responsible for providing those resources is unavailable.

Custer management applications and a communications infrastructure between all the nodes enable a cluster to operate as a single computer system from a user's perspective. Cluster management applications employ an agreed upon communications protocol to send many small messages between nodes. For instance, messages are sent to every node to inform them about the situation with respect to the other nodes in the cluster. Messages are sent to every node to keep them up-to-date as to what nodes have primary and backup responsibilities for which functions. Messages are sent to every node so that all will be in agreement as to what action to take when one node is unable to perform its assigned responsibilities. Every node in the cluster must receive these cluster messages in the correct order to ensure proper cluster functioning.

Because cluster management requires fast transfer of small amounts of information, the communications protocol employed for cluster messaging must support real-time, reliable information transfer. The preferred embodiment of the present invention provides a communication servicer that employees UDP multicasting in conjunction with the IP to facilitate efficient and reliable cluster messaging.

Internet Protocol and User Datagram Protocol

The applications, interfaces, protocols and hardware used facilitate the networking of computers is often described using the Open Systems Interconnection (OSI) standard reference model. This model describes the elements of a networking systems in seven layers, with each layer having its own special set of functions. Each computer on the network is equipped with these seven layers of function. So when a message is sent across the network there will be a flow of data down through each layer at the sending end and, at the other end, when the message arrives, another flow of data up through the layers in the receiving computer. The actual programming and hardware that furnishes these layers is usually a combination of the computer operating system, applications, transport and network protocols, and the hardware and software that enable putting the signal on the transmission media.

The Internet protocol (IP) is a commonly used protocol that implements the network layer of the OSI reference model. The Internet protocol defines the methods by which data is sent from one computer to another on the Internet. The Internet protocol is also becoming the protocol of choice for many other local area networks and wide areas networks. Thus, while the Internet protocol was developed to allow cooperating computers to share resources across the Internet, it can be used to share resources across less sophisticated networks as well, including computers within a localized area, also called a local area networks (LAN), computers at different sites, also called a wide area networks (WAN), and networks interconnected together, also called internetworks.

The IP layer provides the basic service of routing messages to their destinations. Messages can pass through many different networks before getting to their final destination. Yet IP message routing is completely transparent to the user, as long as the user can provide the destination Internet address.

IP routing is based on a numeric "Internet address," which consists of four decimal numbers separated by periods, such as "9.1.1.1." The Internet address can further be broken down into a network address and a host address. In the previous example, the network portion of the address is "9.1.1," and the host address is "1." How much of the Internet address is a network address and how much is a host address varies from network to network. A host is essentially any hardware on a network capable of receiving and transmitting IP messages. With respect to clustering, a host is one of the computer systems (also called nodes) in the cluster.

The User Datagram Protocol (UDP) and Transmission Control Protocol (TCP) are commonly used transport layers that manage the end to end control of data. These layers work togther to send and receive data from the network layer. For example, the TCP protocol handles the dividing of messages into portions called packets at the sending end, and then the reassembly of these packets into the received message at the receiving end. When a message is to be sent, the TCP protocol divides that message into packets, and delivers those packets to the network layer, typically IP, for transmission. On the receiving end, the IP layer receives these packets and delivers the packets to the receiving end TCP layer, where they are reassembled.

UDP provides similar interactions with the network layer, i.e., the sending of data to the network layer and the receiving of data from the network layer. However, UDP does not provide the service of dividing a message into packets and reassembling it at the other end. Specifically, UDP doesn't provide for the sequencing of packets that the data arrives in. This means that applications that use UDP must be able to make sure the entire message has arrived and is in the right order.

TCP is known as a connection oriented protocol, which means that a connection is established and maintained until the messages to be exchanged have been exchanged. TCP is known as a reliable protocol because it has the functionality required to reliable communications. For example, TCP includes functionality to ensure delivery, provide re-delivery when needed etc. In contrast, the UDP protocol is designed to high performance, but without the functionality needed to ensure reliable delivery.

For example, the UDP provides for a technique called multicasting. Multicasting is communication between a single sender and multiple receivers on a network. This allows for more efficient messaging between multiple computers. For example, in a TCP/IP network where multicasting is not provided, a separate message must be sent to each receiving computer. Thus, for each message the data must flow from the application and through the transport and network layers on the sending computer. This sending a separate message to each receiver degrades the performance of the sending system. In contrast, a computer system that provides multicasting, such as a UDP/IP network, the sending message is only delivered once through the sending systems transport and network layers. Thus, the act of sending the same message to many different computers can be accomplished much more efficiently using a multicasting than if separate messages are sent to each computer.

2. Detailed Description

According to the present invention, a cluster communications system is provided that supports reliable and efficient cluster communications. The preferred embodiment cluster communication systems can be used to provide this reliable and efficient cluster communication for cluster configurations extending beyond a single local area network (LAN). The cluster communications system provides reliable and efficient cluster communication by facilitating multicast messaging between systems in the cluster. In particular, the preferred embodiment provides for the establishment of multicast groups in between which multicast messaging is provided. The preferred embodiment provides this multicasting while providing the needed mechanisms to assure ordered message delivery between systems. The preferred embodiment extends this efficient and reliable cluster communication by providing for additional point-to-point communication between systems not on the same LAN. Thus, the preferred embodiment provides a cluster communication system that uses reliable multicasting for efficient cluster communication in a way that can be used for clusters that extend beyond a single local area network.

Referring now to FIG. 1, a computer system 100 in accordance with a preferred embodiment of the present invention is an AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 illustrates in detail the preferred embodiment of how one node in a cluster would be configured, where other nodes in the cluster reside on network 195. Computer system 100 suitably comprises a processor 110, a main memory 120, a memory controller 130, an auxiliary storage interface 140, a terminal interface 150, and a network interface 190, all of which are interconnected via a system bus 160. Note that various modifications, additions, or deletions may be made to computer system 100 illustrated in FIG. 1 within the scope of the present invention, such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes computer programs within main memory 120 as needed.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/ or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Network interface 190 supports the transfer of information between computer system 100 and remote computer systems in network 195. In the preferred embodiment, one or more nodes on the network 195 are similarly set up to work with computer system 100 as a cluster. Network interface 190 suitably includes one or more network interface adapters 193, each network interface adapter 193 typically implemented as an expansion card that can easily be added to computer systems such as computer system 100. Examples of network interface adapter 193 include Peripheral Component Interconnect (PCI) expansion cards, Industry Standard Architecture (ISA) expansion cards, proprietary adapter cards, and any types of adapters known now or invented in the future. Those skilled in the art will recognize that the functionality of network interface 190 can be implemented directly as part of main memory and processor 110. Network 195 represents any type of network known to those skilled in the art. This includes Internet, Intranets, Local Area Networks (LAN's), Wide Area Networks (WAN's) or any configuration of hardware and software, currently known or developed in the future, by which computer systems communicate with each other.

Main memory 120 suitably contains one or more application programs 121, cluster management applications 122, an operating system 123, a Cluster Topology Servicer 124 and a Cluster Communication Servicer 125. All of these programs in memory in memory 120 are used in its broadest sense, and includes any and all forms of computer programs, including source code, intermediate code, machine code, and any other representation of a computer program.

In the preferred embodiment, application programs 121 can comprise any program for which clustering will be used to provide increased reliability and scalability. As such, application programs 121 would typically include all the programs for which computer system 100 is either a primary or a backup node. Examples of such application programs include Web Servers, File Servers, Data Base Servers, etc.

Cluster management application 122 provides the mechanism needed to create an manage the cluster. This would include the processing of administrative requests for the management of a computer cluster. For example, this would preferably include the mechanisms for creating a cluster, adding and removing nodes to a cluster, etc.

In the preferred embodiment, a cluster topology servicer 124, a cluster communication servicer 125, and a network message servicer 126 are integrated with the operating system 123 and provide the base functionality for facilitating communication between nodes in the cluster. Of course, those skilled in the art will recognize that these functions can also be provided as add on applications to other operating systems. For example, the functionality could be added to operating systems such as IBM's OS/2, OS/400 and RS/6000, Microsoft's Windows NT, Novell's NetWare, Linux and the other various flavors of Unix.

In the preferred embodiment, the Cluster Topology Servicer 124 provides the functionality needed to set up and implement one or more multicast groups in the cluster. Multicast groups, as the term is used in the application, are nodes that have grouped together to allow the sending of reliable multicast messages to all members of the group. As will be described in greater detail later, in a typical cluster configuration, the primary node and all backup nodes for a particular application would all be made members of a multicast group. This allows for efficient and reliable messaging between all nodes that share common responsibilities.

In the preferred embodiment, the Cluster Communication Servicer 125 provides the networking facilitates to send and confirm receipt of multicast messages. Additionally, the Cluster Communication Servicer 125 also includes the ability to send point to point messages to individual nodes in the cluster as needed. The Cluster Communication Servicer 125 also provides the ability to assure ordered delivery of both multicast and point to point messages.

In the preferred embodiment, the Network Message Servicer 126 comprises a protocol suite for sending and receiving multicast and point to point messages as directed by the Cluster Communication Servicer 125. To facilitate this, Network message servicer 126 suitably comprises User Datagram Protocol 127 and Internet Protocol 128. User datagram protocol 127 adds standard header formatting to messages to be sent to other computers in network 195. Internet protocol 128 uses the transport layers beneath it to route messages to other computers in network 195. As will be explained in more detail later, the preferred embodiment of the present invention uses and expands upon the multicast capabilities of UDP/IP to facilitate reliable and efficient cluster communications.

It should be understood that main memory 120 will not necessarily contain all parts of all mechanisms shown at all times. For example, portions of application program 121, cluster management application 122, and operating system 123 may be loaded into an instruction cache (not shown) for processor 110 to execute, while other files may well be stored on magnetic or optical disk storage devices (not shown). In addition, although the computer programs are all shown to reside in the same memory location, it is to be understood that main memory 120 may consist of disparate memory locations. The term "memory" as used herein refers to any storage location in the virtual memory space of system 100.

It should also be understood that computer system 100 is exemplary of each node in a cluster, and that thus each node in the cluster would preferably comprise a Cluster Topology Servicer 124 and a Cluster Communication Servicer 125 to facilitate reliable multicast messaging between nodes in the cluster.

Figure 2:
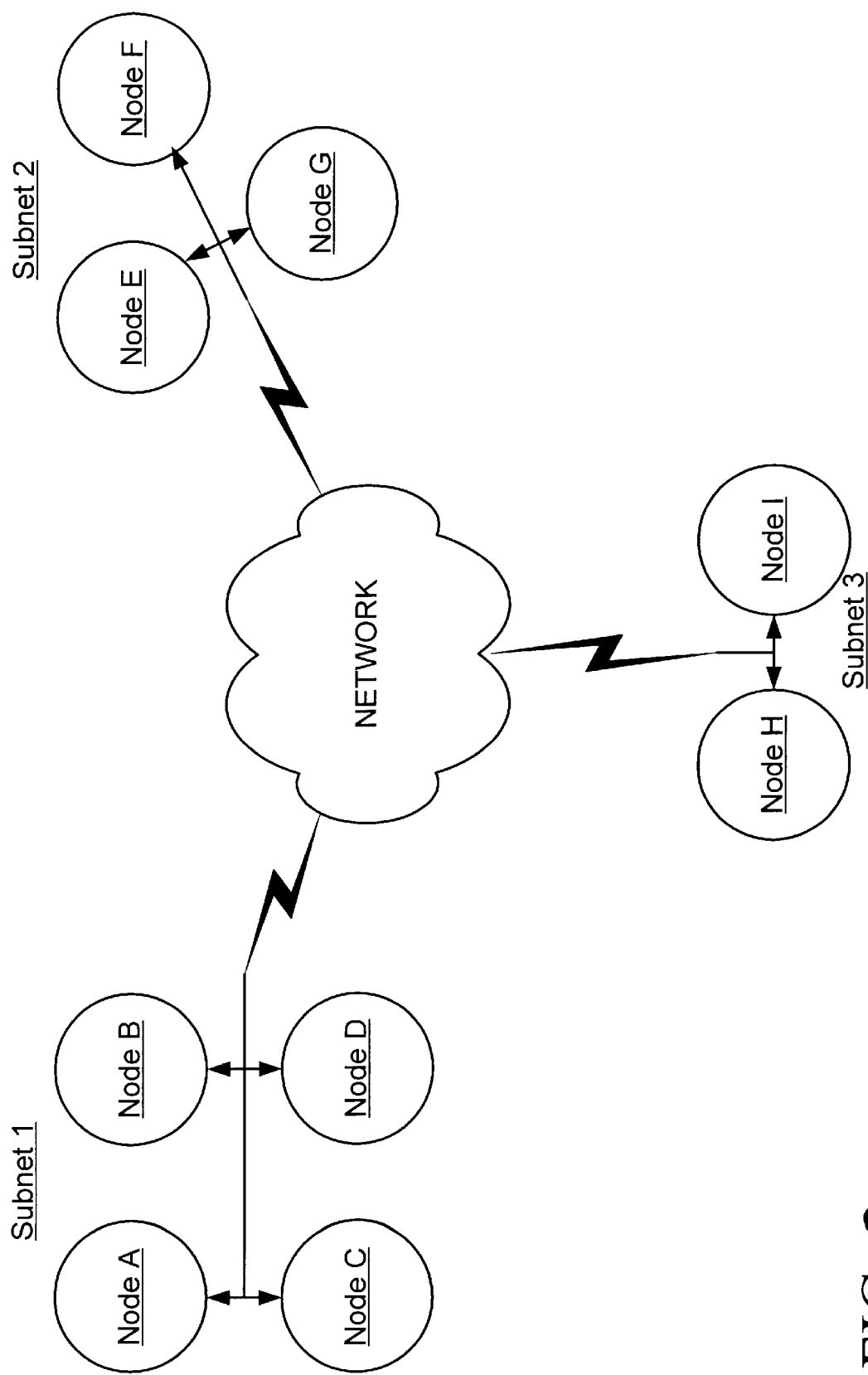
FIG. 2 is a schematic diagram illustrating a cluster.

Turning now to FIG. 2, an exemplary cluster of computer systems 200 is schematically illustrated to shown how the preferred embodiment of the present invention facilitates efficient and reliable messaging between nodes in a cluster. In particular, FIG. 2 will be used to illustrate how the preferred embodiment allows clusters to be expanded beyond a single LAN. The exemplary cluster 200 includes nine nodes, with nodes A–D residing on subnet 1, nodes E–G residing on subnet 2, and nodes H and I residing on subnet 3. The nodes on each subnet are connected together in a local area network and have a common network address (e.g., a common IP prefix). The three subnets are connected together by a network. This network is preferably provided by standard IP connections, and the associated hardware (e.g., routers, transmission media, etc). As an example, the subnets could be connected by Internet, Intranet or through dedicated wide area network connections.

In the preferred embodiment, one node on each subnet is designated as a relay node. As will be described in more detail later, the relay node is the node to which multicast cluster messages are sent from other subnets, and the relay node then multicasts the messages to the other nodes in that subnet. For example, node A could be designated as a relay node for subnet 1, node E designated as a relay node for subnet 2, and node H designated as a relay node for subnet 3.

In the preferred embodiment, one or more multicasting groups are established on the exemplary cluster 200. As described above, multicasting groups are groups of nodes in the cluster that have been designated to communicate using the reliable multicasting techniques provided by the preferred embodiment. Typically, a group would be defined for each set of nodes, primary and backup, working together for to support a particular application.

For example, a multicasting group could be established comprising nodes A, C and D on subnet 1. This multicasting group could be then used to provide a web server, with node A serving as primary nodes and nodes C and D serving as backup nodes. A second multicasting group can comprise nodes B and D on subnet 1 and nodes E, G and F on subnet 2. This multicasting group can then be used to provide a database, with node E serving as a primary node, and nodes B, D, F and G serving as backup nodes. Of course, those skilled in the art will recognize that these are only two of the many different types of applications and groups that could be supported using the preferred embodiment of the present invention.

With these groups so defined, the preferred embodiment facilitates reliable multicasting between nodes in these defined groups, while still allowing for the cluster to exist beyond the confines of a single LAN. This allows the cluster applications to send cluster messages using reliable multicast messaging.

Turning now to FIG. 3, the preferred embodiment Cluster Management Application 122 is illustrated in more detail. As described above, the Cluster management application 122 provides the mechanism needed to create an manage the cluster. The Cluster Management Application 122 is accessed using a defined interface that calls the appropriate methods on the Cluster Management Application 122 when needed. The Cluster Management application preferably includes a createCluster() method, a destroyCluster() method, a resolveCluster() method, a addNode() method, a removeNode() method, a startNode() method and an endNode() method. These methods provide the mechanism needed for creating a cluster, adding and removing nodes to a cluster, etc.

The createCluster() method is used to create a cluster, and takes as an input the name of the cluster to be created. This would also preferably involve the creation of a ClusterTopology object for providing the Cluster Topology Servicer 124 functionality and a Cluster Communication object for providing the Cluster Communication Servicer 125 functionality. Likewise, the destroyCluster() method takes as a parameter the name of a cluster, and deletes any persistent objects created implement the cluster. The resolveCluster() method is a method provided to retrieve a pointer to the Cluster Topology Servicer object for a specified cluster given a cluster name. The addNode() method adds a specified node to a specified cluster. This method also assigns specified IP addresses to the specified node. The removeNode() method removes a specified node from the cluster. The startNode() method allows a node that has been added to the cluster to be initialized and started as an active cluster node. Likewise, the endNode() method takes a node that has been added to a cluster and deactivates it.

Turning now to FIG. 4, the preferred embodiment Cluster Topology Servicer 124 is illustrated in more detail. The Cluster Topology Servicer 124 provides the functionality needed to set up and implement one or more multicast groups in the cluster. Again, multicast groups, as the term is used in the application, are nodes that have grouped together to allow the sending of reliable multicast messages to members of the group. Once a multicast group has been set up, communication between nodes in a group can be done using multicasting. Multicasting allows for efficient and reliable messaging between all nodes that share common responsibilities.

The Cluster Topology Servicer 124 preferably includes a createMCGroup() method, an addMCGroupMembers() method, a removeMCGroupMembers() method, a deleteMCGroup() method, a resolveCCServices() method, a startNode() method and a endNode() method. The createMCGroup() creates a new multicasting group using the specified name. The addMCGroupMembers() method adds a new specified node to a specified multicast group. This method also assigns the specified node to receive messages sent to the appropriate UPD multicast address for its subnet. Likewise, the removeMCGroupMembers() method removes a specified node from a specified multicasting group. The deleteMCGroup() method deletes a specified multicast group. The resolveCCServices() method returns a pointer to the Cluster Communications Services object on that node.

Figure 5:
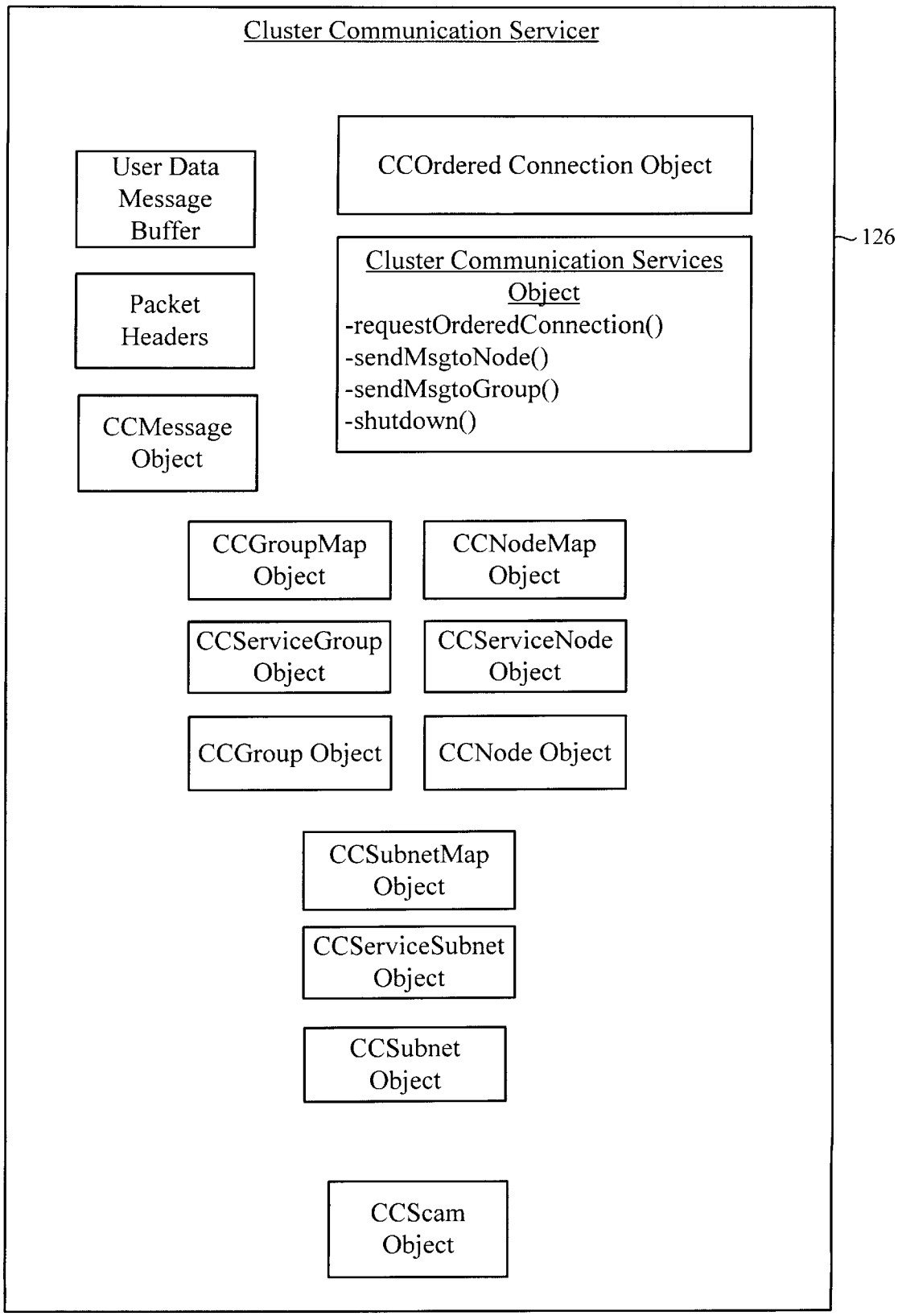
FIG. 5 is a diagram of a cluster communication servicer in accordance with the preferred embodiment of the present invention.

Turning now to FIG. 5, the preferred embodiment Cluster Communication Servicer 125 is illustrated in more detail. Again, the Cluster Communication Servicer 125 provides the networking facilitates to send and confirm receipt of multicast messages to previously defined multicast groups, and the ability to send and confirm receipt of point to point messages to individual nodes in the cluster as needed. The preferred embodiment Cluster Communication Servicer 125 is implemented using object-oriented technologies, and preferably includes: a Cluster Communication Services object; a CCOrderedConnection object for each message queue in the cluster; a CCMessage object for each currently pending message; a packet header for each destination subnet attached to each active CCMessage object; a user data message buffer; a CCGroupMap object; a CCServiceGroup object and CCGroup object for each defined multicast group; a CCNodeMap object; a CCServiceNode object and CCNode object for each node in the cluster; a CCSubnetMap object; a CCServiceSubnet object and CCSubnet Object for each subnet in the cluster; and a CCScam object.

It should be noted that at the outset that in the preferred embodiment, a Cluster Communication Servicer 125 exists on each node in the cluster. The Cluster Communication Servicer 125 acts as both a sender of messages to other nodes, and a receiver of messages from other nodes. In its sending function, the Cluster Communication Servicer 125 is used to send messages to other nodes, including multicast messages to predefined groups. Also, in its sending function the Cluster Communication Servicer 125 tracks the receipt acknowledgments from all nodes that receive a message, and assures that additional messages will not be sent until previous messages have been received. In its receiving function, the Cluster Communication Servicer 125 receives messages from other nodes on the cluster, and passes those messages onto their ultimate destination. Also, in its receiving function it tracks the receipt of messages to assure that a message is not inadvertently passed on to the destination twice, and sends acknowledgment messages to the nodes sending the message.

The Cluster Communication Services object provides the base functionality of the cluster communication servicer 125, and includes methods for sending point-to-point messages to specified nodes and sending multicast messages to previous defined multicast groups. The cluster communication services object also includes methods to assure delivery of both multicast messages and point to point messages in a specified order.

In particular, the sendMsgtoNode() method sends a point to point message to the node specified in the call. Likewise, the sendMsgtoGroup() method sends a multicast method to specified group.

The requestOrderedConnection() method allows point to point messages to a member of a group to be ordered with respect to multicast messages in the specified message queue. As will be described in more detail later, each multicast group preferably has a CCOrderedConnection object implementing an ordered multicast message queue for that group. Additionally, it is also preferable that an another CCOrderedConnection object be used to implement a message queue for point to point messages. Typically, these messages queues send messages to their respective nodes and groups in first in, first out fashion. The requestOrderedConnection() method returns a pointer to the specified send CCOrderedConnection object. The CCOrderedConnection object can be specified by group name, in which case the pointer returned is for the CCOrderedConnection object for the specified group, or by node name, in which case the pointer returned is the CCOrderedConnection object for the specified node. This pointer can then be used as a parameter for the send message methods, allowing a particular message to be directed to a specified queue. This can be used to allow a point to point message to be inserted into any specified CCOrderedComection object. For example, by obtaining a pointer to the CCOrderedConnection object for a particular multicast group, a point to point message can be delivered in a particular order with respect to the multicast messages sent to that group through that message queue. Thus, this method facilitates the ordering of messages across mixed message types.

The sendMsgtoNode() method sends a message to a specified node. In particular, the sendMsgtoNode() method takes a destination node ID, a pointer to the message to be sent, a pointer to a object notify object that will be notified if the message cannot be delivered or confirm delivery, and a pointer to a flag object used to pass in send options. These send options would typically include things such as reliable messaging, unreliable messaging, notify on failure, notify on successful delivery, etc. Reliable messaging uses the CCOrderedConnection objects send queues to ensure ordered, confirmed delivery, reliable messaging. Unreliable messaging bypasses the send queue, and sends the message directly to the CCNode object without requesting acknowledgment from the recipient. Unreliable messaging is used for thing that do not require confirmation, such as cluster heartbeat messages, and hence do not need to use bandwidth in the send queues. The Notify on failure and notify on delivery parameters determine whether to notify the sender if the message fails (after exhausting all retries), or if the sender should be just notified on delivery.

Likewise, the sendMsgtoGroup() method sends a message to a specified group. This message takes a destination group ID, a pointer to the message to be sent, a pointer to a object notify object that will be notified if the message cannot be delivered or confirm delivery, and a pointer to a flag object used to pass in send options. These send options would typically include things such as reliable messaging, unreliable messaging, notify on failure, notify on successful delivery, etc. Again, reliable messaging uses the CCOrderedConnection objects send queues to ensure ordered, confirmed delivery, reliable messaging. Unreliable messaging bypasses the send queue, and sends the message directly to CCGroup object without requesting acknowledgment from the recipients. Again, the Notify on failure and notify parameters determine whether to notify the sender if the message fails (after exhausting all retries), or if the sender should be just notified on delivery.

The Shutdown() method is used to terminate the communications when needed. As discussed above, the preferred embodiment uses the UDP/IP protocols to facilitate communications between nodes in the cluster. This requires the opening of UPD ports during creation. The Shutdown() method is used to set the state of the Cluster Communication Services object, take any remaining messages out of the queue, and shut down any open UPD ports that this cluster was using.

The CCGroupMap object includes a map for all multicast groups defined in the cluster. In particular, the CCGroupMap object includes a listing of all multicast group ID's in the cluster and a pointer to the CCServiceGroup object for each of the multicast groups. As stated above, a CCServiceGroup object and CCGroup object is preferably created for each defined multicast group. The CCServiceGroup object preferably includes those items that are specific to a particular Cluster Communication Service object. In particular, the CCServiceGroup object preferably includes a subnet delivery table, which lists the various subnets and the nodes on those subnets in the in the corresponding group. This table is used to determine what subnets need to be sent messages for a specified group. The CCServiceGroup object also preferably includes the "last message sequence number" for each group that tracks the sequence number used for the last message sent to each group, and a "subnets waiting counter" array that keeps track of what CCSubnet objects have been fully acknowledged for each message queue. When all CCSubnet objects that originally sent the message have decremented the CCGroup object subnets waiting counter, the counter goes to zero.

The CCNodeMap object likewise includes a map for all nodes in the cluster. In particular, the CCNodeMap object includes a listing of all node ID's in the cluster and a pointer to the CCServiceNode object for each of node. As stated above, a CCServiceNode object and CCNode object is preferably created for each node in the cluster, including the resident node. The CCServiceNode object preferably includes "last message acknowledged" array, with each entry storing the sequence number of the last message that was acknowledged as being received by the corresponding node for each message queue. As will be described later, this array can be used to determine what nodes have not acknowledged receipt of a message.

The CCNode object preferably includes the addresses for that node. This would preferably include the default point to point address for that node, and any other point to point addresses for that node. It would also include the default multicast address for that node.

The CCServiceNode object also preferably includes a "receive next" array, which each entry corresponding to the next sequence number to be received and forwarded by the CCServiceNode object for each message queue. The CCServiceNode object will only forward messages that have this sequence number, or a higher sequence number. This assures that the CCServiceNode object will not forward a message to its destination that has already been received and forwarded. The CCServiceNode object receives and forwards higher numbered sequence messages to account for the fact that intervening messages could have been point to point, and not sent to the receiving node. There is no risk of this allowing a message to be inadvertently missed because messages will be resent until received by all destination nodes or until the destination node is determined to be unavailable and is removed.

It should be pointed out that the CCNode object and the CCServiceNode object thus facilitate the "receiving function" of the Cluster Communication Servicer 125 for messages sent to that node. In particular, the CCNode object and CCServiceNode object for the "sending node" (i.e., the node that sent the subject message) receive messages that are sent to resident node, and pass those messages on to their destination (such as the cluster engine), and initiate an acknowledgment if one is requested. It is for this reason that the CCServiceNode object includes the "receive next", with each number in the array comprising the next sequence number that the node expects from the corresponding message queue on the sending node. As stated before, this array is used to assure that the CCServiceNode object does not inadvertently deliver a second copy of a message to the destination, for example, when a resend is done to complete delivery to other nodes.

It should be also be noted that the Cluster Communication Servicer 125 for each node would preferably include a CCNode object and CCServiceNode for itself, the local node. These objects are used to facilitate the "receiving function" of the Cluster Communication Servicer 125 for loopback messages, i.e., messages that are sent to itself.

The CCSubnetMap object likewise includes a map for all subnets that include cluster nodes. In particular, the CCSubnetMap object includes a listing of all subnet ID's having cluster nodes and a pointer to the corresponding CCServiceSubnet object. As stated above, a CCServiceSubnet object and CCSubnet object is preferably created for each subnet having a cluster nodes. The behavior of these objects would depend on the type of corresponding subnet. For example, where the corresponding subnet is the local LAN, the CCSubnet object uses UDP multicast to multicast to the group. As another example, where the corresponding subnet is a non-local LAN containing multiple members of the multicast group, the CCSubnet uses UDP point to point messaging to send a message to a "relay node", and the relay node then uses UDP multicasting to multicast to the node members in the group. Other variations would exist for a "loopback" subnet, which is for messages "sent back" to the sending node. This is done by simply passing the appropriate pointer to the node object, and point-to-point subnets, that facilitates point-to-point messages to a specified node.

Each CCSubnet object preferably includes a default address to use if not is specified on send. This default address would depend on the type of corresponding subnet. In particular, in the preferred embodiment there are three types of default address, multicast, point-to-point and loopback. For point to point subnets, the default address would simply be the IP address of the destination node. For loopback subnets, the default address can either be the IP address of itself, or a specialized default address used to indicate that the message is to be passed to itself. For multicast subnets, a predefined default UDP multicast address is preferably established and used to address that multicast group. Messages sent to this address are recognized by UDP and multicast by UDP. All nodes that are added to that multicast group are registered with the IP stack to receive messages sent to that address. It should be noted that all groups can be assigned to a single default UDP multicast address if desired. Nodes in the local subnet that are not in the group will then receive all multicast messages, but will only act upon those messages sent to a group of which they are a member. These messages can be preventing from being inadvertently spread beyond the local subnet by setting the "time to live" IP parameter to one. As is known in the art, routers decrement the time to live parameter for relaying a message, and if the time to live is zero, the router will not relay the message. Thus, by setting the time to live to one, multicast messages can all be sent to the same default UDP multicast address without causing excessive messaging. As was stated above, separate point-to-point messages are sent to relay nodes on the non-local LANs that contain members of the specified group, thus assuring that those members will also receive the message.

Each CCServiceSubnet object preferably includes an "acknowledgment counter" array, with the array having an acknowledgment counter for each message queue. The acknowledgment counters are decremented as acknowledgment messages are received by the CCNode objects, allowing the CCSubnet object to determine when all nodes have acknowledged receipt of the message. The CCServiceSubnet object also preferably includes a "retries left" array, with the array listing the number of retries left to attempt for each message queue before a message send is determined as failed. After a number of fails, attempts are made to send the message to other available addresses, such as the default point to point address for that node.

As stated above, the CCOrderedConnection objects implement ordered message queues. In the preferred embodiment a CCOrderedConnection object is provided for each defined multicast group. Additionally, it is also preferable that at least one other CCOrderedConnection object be used to implement a message queue for point to point messages.

A CCMessage object is used for each message that is to be sent. The CCMessage object preferably includes a pointer to the message data, stored in the user data message buffer. The CCMessage object is the object that gets enqued on in the CCOrderedConnection message queue. For reliable messaging, the CCMessage object is kept until all nodes and groups that are supposed to receive the message acknowledge receipt. At that time, the CCMessage object is put back into a pool of available objects until it is initialized for a new message. The CCMessage object preferably identifies whether it is for a single node or a multicast group, the source and destination ID's, the message ID, whether the message is to be sent reliably or unreliably, whether the message is for a client or for the cluster infrastructure, the associated message queue, and the notify object to call on completion of the message. This data can be used to build the packet headers that are attached to the CCMessage objects.

Packet headers are built and attached to each active CCMessage object. In particular, in the preferred embodiment a packet header is built and attached to the CCMessage object for each subnet the corresponding message is to be delivered to. For example, if a message is to be sent to nodes on subnets 1, 2 and 3, a packet header would be put on the corresponding CCMessage object for each of these destination subnets. Each of these packet headers preferably includes the source and destination ID's, the source and destination addresses (for either a node or a group), a pointer to the a flag object that specifies request services, the message sequence number and the ordered connection number specifying the message queue. The header also preferably includes a relay bit that is used to indicate whether the receiving node should relay this message to other nodes on its LAN, or whether it is just a normal point to point message.

The CCScam object facilitates messaging between the CCSubnet objects and the underlying UDP/IP protocols. The CCScam object thus preferably includes a variety of send message methods that are called by the CCSubnet object when messages are to be sent. This would preferably include methods for sending "reliable messages" that sets a on the message flag requesting acknowledgment back to the sending. Also included is a method for sending "unreliable messages" that does not request acknowledgment, but passes on any previously made requests for acknowledgment. The CCScam preferably includes methods for sending packet header information. This message just sends the packet header, and not the CCMessage object. This method is used to acknowledge messages back to the sending node, conserving bandwidth. When these send methods are called, the CCScam passes the message to the underlying UDP/IP layer for transmission to the specified nodes.

The CCScam object also preferably includes a mechanism for breaking large messages up into smaller packets when needed. These packets can then be put back together in their proper order by the receiving CCSubnet object. This allows large messages to be sent through relatively low bandwidth connections on the network, improving messaging reliability.

Figure 6:
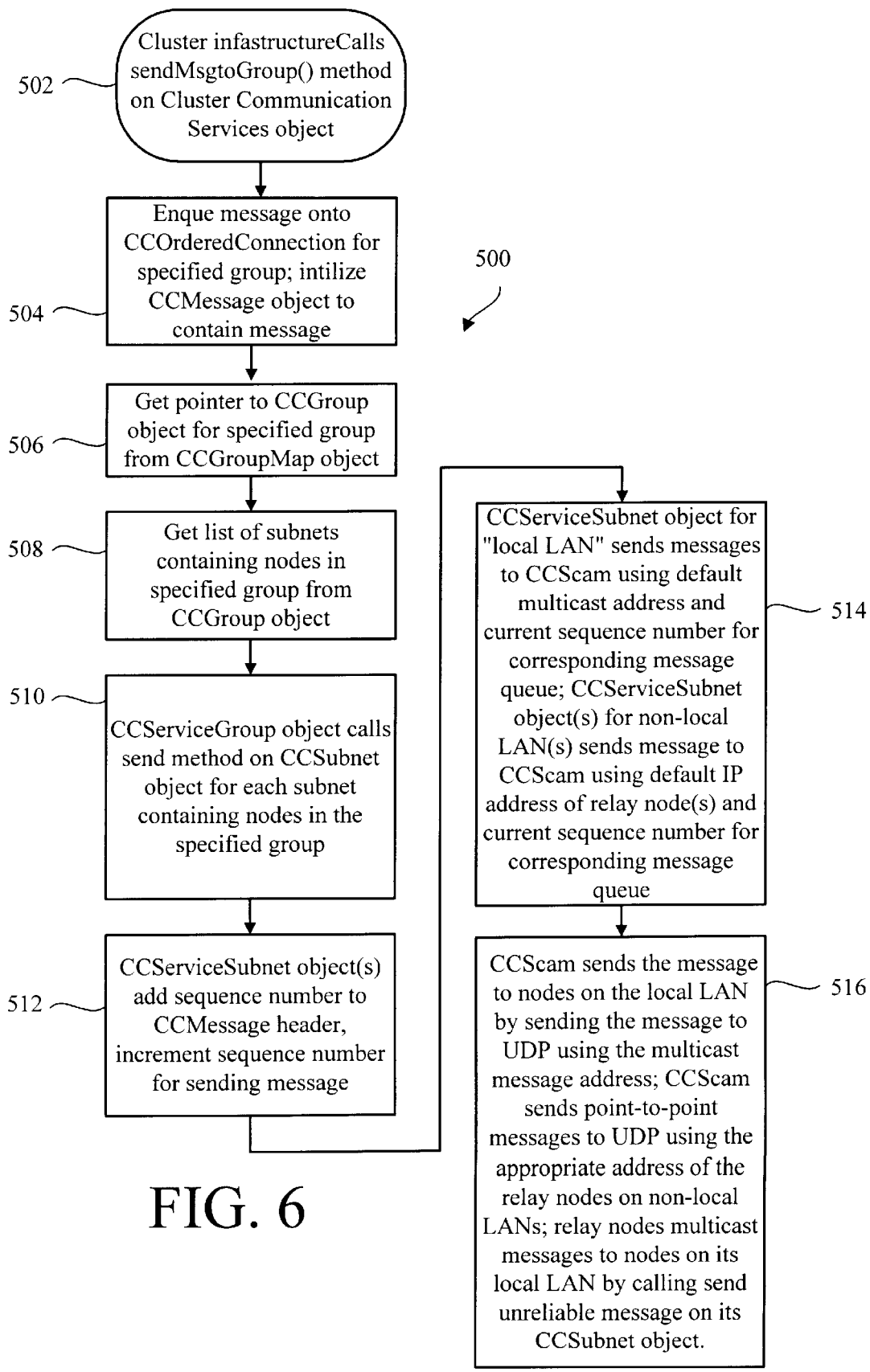
FIG. 6 is flow diagram illustrating a method for sending multicast messages in accordance with the preferred embodiment.

Turning now to FIG. 6, a method 500 for sending multicast messages in accordance with the preferred embodiment is illustrated. The first step 502 is when the cluster infrastructure calls the sendMsgtoGroup() method on the Cluster Communication Services object. As previously stated, the cluster infrastructure above would call this and the sendMsgtoNode() method when cluster messages need to be sent from to the other nodes on the cluster. Thus, this would involve a wide range of message types and content, as known in the art. This method would specify the multicast group the message is to be sent to, and include pointer to buffer containing the message data.

The next step 504 is to enque the sent message onto the CCOrderedConnection object that stores the appropriate message queue, and initialize a CCMessage object to contain the message. As stated previously, the preferably exists a CCOrderedConnection message queue for each multicast group, and at least one for point to point messages. The sendMsgtoGroup() method adds the specified message to the message queue for the specified multicast group. A CCMessage object is created for containing the message data, preferably by selecting the object from a pool of available CCMessage objects that are kept for this purpose.

The next step 506 is to get a pointer to the CCGroup object for the specified multicast group from he CCGroupMap object. As described above, the CCGroupMap object preferably includes a listing of all previously created multicast groups, and pointers to their associated CCGroup and CCServiceGroup object. With that pointer, the next step 508 is to get a list of subnets that contain nodes in the specified multicast group. As described above, a list of those subnets is stored in the CCGroup object when the multicast group was created. Additionally, pointer to each CCSubnet object corresponding to a subnet containing nodes in the multicast group is stored in the CCGroup object.

The next step 510 is to call the appropriate send method on each CCSubnet object that corresponds to a subnet containing nodes in the multicast, using the pointers supplied from the CCSubnet group. The CCSubnet object(s) calls the send method on the corresponding CCServiceSubnet object. The next step 512 is for the CCServiceSubnet object(s) to add the current sequence number to the message headers, and to increment the sequence number for sending messages. This assures that the next message receives a higher sequence number then the current message.

The next step 514 is for the CCServiceSubnet objects to send the messages to the CCScam object by calling the appropriate method on the CCScam object and passing the appropriate address to the CCScam object. The address passed would depend upon the type of subnet being sent to, with different addresses corresponding to multicast, relay, loopback and point to point messages. For multicast messages, the CCServiceSubnet object sends the default UDP multicast address and the current sequence number. For both relay and point-to-point the CCSubnet object sends the IP address of the destination node and the current sequence number for the corresponding message queue. For loopback, the address is a predefined loopback address that indicates the message is only to be passed to itself without going through the full UDP/IP stack.

The next step 516 is for the CCScam to send the message to nodes on the local LAN by sending the message to UDP using the multicast message address, and for CCScam to send point-to-point messages to UDP using the appropriate address of the relay nodes on non-local LANs. The UDP layer then formats and sends the message to IP, using UDP multicasting as appropriate, which delivers it to the destination nodes, up through IP and UDP to the CCNode object for the sending node on the destination node.

Destination nodes that are relay nodes check the relay bit on the header and recognize that this is a relay message, and then call their CCScam object to multicast the message to other members of the group on its LAN. The relay nodes use the unreliable messaging sending because the only acknowledgment needed is back to the sending node. As described above, the unreliable message sends the message without the request for acknowledgment from the relay node, but includes the request for acknowledgment from the original sending node.

Figure 7:
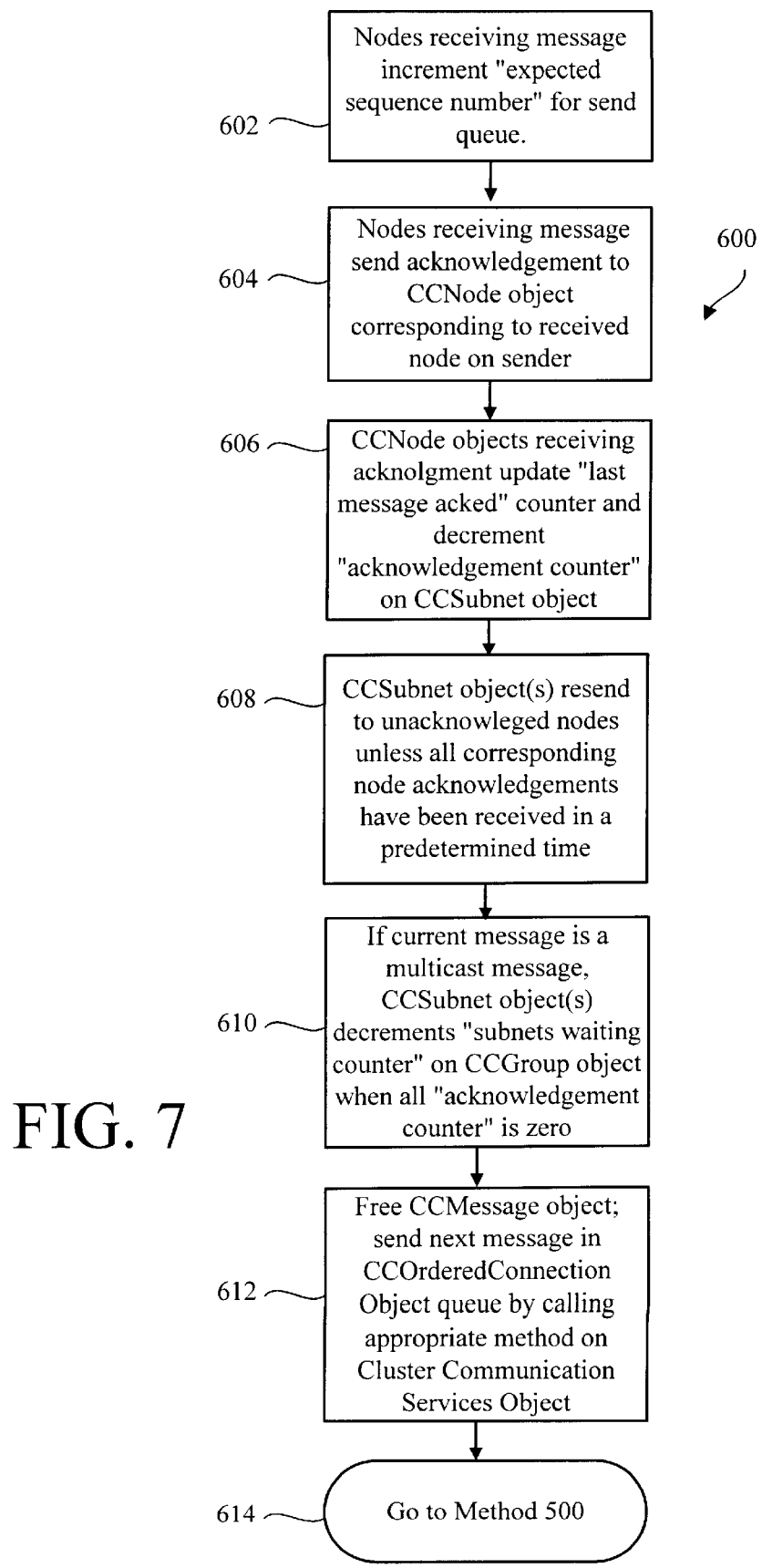
FIG. 7 flow diagram illustrating a method for acknowledging and multicast messages in accordance with the preferred embodiment.

With the message sent, the preferred embodiment then waits to receive acknowledgment from all destination nodes before sending the next message from the message queue. By doing this, the preferred embodiment can assure reliable delivery, and can additionally assure that messages are received as ordered in each message queue. This provides the efficiency of multicasting with the reliability and ordering needed to effectively support cluster communications, while still providing the flexibility to extend the cluster beyond a single LAN. Thus, turning to FIG. 7, a method 600 is illustrated for acknowledging messaging to assure proper ordering of messaging.

The first step 602 is for all nodes receiving a message to increment their "expected sequence number" for the message queue. As stated before, each node contains a node object for itself that includes an "expect sequence number array", with each number in the array comprising the next sequence number the node objects expects from the corresponding message queue. The node object only receives messages that are the equal to or above the expected sequence number for the sending message queue.

The next step 604 is for all nodes receiving the message to send acknowledgment messages back to the sending node. The nodes perform this by calling a send acknowledgment method on the CCSubnet, the CCSubnet then calls the send packet header method on their CCScam object. As described above, the send packet header method sends acknowledgment in the form of a packet header message to the originally sending node. This message is sent as a point to point method to the CCNode object for receiving node on the original sending node.

The next step 606 is for the CCNode object(s) on the sending node to update their "last message acknowledged" number for the corresponding message queue as acknowledgments are received. The CCNode objects also decrements the "acknowledgment counter" on the CCSubnet object corresponding to the receiving node. This continues until all CCNode objects have received acknowledgment and decremented the associated acknowledgment counter to zero. If after a predetermined time period the acknowledgment counter for a message queue as not been decremented to zero, the next step 608 is for the CCSubnet object to resend the message to all the nodes that have not acknowledged receipt. The CCServiceSubnet object polls each node object for the nodes in the group to determine which nodes did not acknowledge the last message. The CCServiceSubnet object then resends the message to any nodes that did not acknowledge by calling the appropriate method on the CCScam object. This call can be for point to point messages, or a new multicast can be performed if many nodes did not acknowledge receipt.

When the acknowledgment counter for a message queue has been decremented to zero, meaning that all nodes have acknowledged receipt, the next step 610 is for the CCSubnet object(s) to decrement the "subnets waiting counter" the CCGroup object that originally sent the message. When all CCSubnet objects that originally sent the message have decremented the CCGroup object subnets waiting counter, the counter goes to zero. This signifies to the CCGroup object that the message was successfully sent to all nodes in the multicast group, and that the next message for the corresponding message queue can be sent.

Accordingly, the next step 614 is to free the CCMessage object corresponding to the sent message. This returns the object to the pool of available CCMessage objects. The next message in the CCOrderedConnection message queue is then sent by calling the appropriate method on the Cluster Communication Services object. This returns the process to step 504 in method 500.

According to the present invention, a cluster communications system is provided that supports reliable and efficient cluster communications. The preferred embodiment cluster communication systems can be used to provide this reliable and efficient cluster communication for cluster configurations extending beyond a single local area network (LAN). The cluster communications system provides reliable and efficient cluster communication by facilitating multicast messaging between systems in the cluster. In particular, the preferred embodiment provides for the establishment of multicast groups in between which multicast messaging is provided. The preferred embodiment provides this multicasting while providing the needed mechanisms to assure ordered message delivery between systems. The preferred embodiment extends this efficient and reliable cluster communication by providing for additional point-to-point communication between systems not on the same LAN. Thus, the preferred embodiment provides a cluster communication system that uses reliable multicasting for efficient cluster communication in a way that can be used for clusters that extend beyond a single local area network.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to at least one processor;
   a cluster communication servicer residing in said memory, said cluster communication servicer facilitating multicast cluster messaging to a plurality of other nodes in a cluster without requiring an intervening dedicated local area network to said plurality of other nodes, the cluster communication servicer including a group send mechanism for sending messages to a predefined group of nodes in the cluster, wherein the group send mechanism sends messages to the redefined group of nodes in the cluster by sending a multicast message to members of the redefined group of nodes on a local network and sending a point to point messages to a relay node for members of the predefined group of nodes in the cluster on non local networks.

2. The apparatus of claim 1 further comprising cluster topology servicer including mechanisms for defining multicast groups of nodes and adding and removing nodes to the multicast groups of nodes.

3. The apparatus of claim 1 wherein the cluster communication servicer further includes a node send mechanism for sending messages to a specified node in the cluster.

4. The apparatus of claim 1 wherein the group send mechanism passes the multicast message to a UDP/IP stack using a predefined UDP multicast address, and passes the point to point message to the UDP/IP stack using an IP address of the relay node.

5. The apparatus of claim 1 wherein the group send mechanism waits to send a next group message until all members of the predefined group have acknowledged receipt of a previous message.

6. The apparatus of claim 1 wherein the cluster communication servicer further includes a plurality of node objects for receiving messages from other nodes in the cluster and delivering the received message to a client, and wherein the plurality of node objects include a plurality of receive next parameters, with each of the plurality of receive next parameters indicating a sequence number for a next message to be received for a corresponding message queue such that the plurality of node objects will not redeliver a received message that has been previously delivered by the node object.

7. The apparatus of claim 1 wherein the cluster communication servicer further includes a plurality of group message queues, wherein at least one of the plurality of group message queues corresponds to one of a plurality of predefined groups and orders group messages for sending to the corresponding predefined group such that group messages are sent in the order placed into the corresponding group message queue, and wherein the cluster communication servicer further includes at least one point to point message queue, wherein the point to point message queue orders point to point messages sent to individual nodes in the cluster.

8. The apparatus of claim 7 wherein the cluster communication servicer adds header information to each message, and wherein the header information includes a message sequence number for the corresponding message queue, a relay parameter indicating whether the message is a relay message, and a reliable parameter indicating whether acknowledgment of receipt is requested.

9. The apparatus of claim 1 wherein the cluster communication servicer further includes a plurality of subnet objects, with a subnet object existing for each network that includes nodes in the cluster, and wherein the subnet object includes a default address for the local network, and wherein the default address of the local network is a multicast address, and wherein the default address of a non local network is an address of a relay node on the non local network.

10. The apparatus of claim 9 wherein the cluster communication servicer further comprises a loopback subnet object having a default address, and wherein the default address of the loopback subnet object comprises a loopback address.

11. An apparatus comprising:
    at least one processor;
    a memory coupled to at least one processor;
    a cluster communication servicer residing in said memory, said cluster communication servicer including:
       a group send mechanism for sending group messages to predefined groups of nodes in a cluster, wherein the group send mechanism delivers group messages to a send queue corresponding to a specified group of nodes, the message queue sending the group message to the specified group of nodes in the cluster by sending a multicast message to members of the specified group of nodes on a local subnet and sending a point to point messages to a relay node for members of the specified group of nodes in the cluster on non local subnets; and
       a plurality of node objects for receiving messages from other nodes in the cluster and delivering the received message to a client, and wherein the plurality of node objects include a plurality of receive next parameters, with each of the plurality of receive next parameters indicating a sequence number for a next message to be received for a corresponding message queue such that the plurality of node objects will not redeliver a received message that has been previously delivered by the node object.

12. The apparatus of claim 11 wherein each of the plurality of nodes in the cluster includes the cluster communication servicer.

13. The apparatus of claim 11 wherein the group send mechanism passes the multicast message to a UDP/IP stack using a predefined UDP multicast address, and passes the point to point message to the UDP/IP stack using an IP address of the relay node.

14. The apparatus of claim 11 wherein the message queue waits to send a group message until any previous group messages have been acknowledged as received by all nodes in the corresponding group of nodes.

15. The apparatus of claim 11 wherein the cluster communication servicer further includes at least one point to point message queue, wherein the point to point message queue orders point to point messages sent to individual nodes in the cluster.

16. The apparatus of claim 11 wherein the cluster communication servicer adds a header to each group message corresponding to each subnet that includes nodes in the specified group of nodes, wherein headers for local subnets include a multicast address, headers for non local subnets include an address to the relay node, and headers for loopback subnets include a loopback address.

17. The apparatus of claim 16 wherein the header further includes a message sequence number for the corresponding message queue, a relay parameter indicating whether the message is a relay message, and a reliable parameter indicating whether acknowledgment of receipt is requested.

18. The apparatus of claim 17 wherein the plurality of node objects send an acknowledgment message to a sending node when the received message requests acknowledgment.

19. The apparatus of claim 18 wherein the cluster communication servicer further includes a plurality of subnet objects, with a subnet object existing for each network that includes nodes in the cluster, and wherein the subnet object includes a default address for the corresponding network, and wherein the default address for a local network is a multicast address, and wherein the default address of a non local network is an address of a relay node on the non local network, and wherein the cluster communication servicer further includes a loopback subnet having a default address, and wherein the default address of a loopback subnet comprises a loopback address, and wherein each of the plurality of subnet objects tracks the receipt of acknowledgment messages to assure all members of a group have received the group message.

20. The apparatus of claim 11 wherein the cluster communication servicer further includes a node send mechanism for sending messages to a specified node in the cluster.

21. A method for sending a group message from a sending node to a group of nodes in a cluster, the method comprising the steps of:
sending a multicast message to members of the group in a local subnet, the multicast message comprising a UDP/IP multicast message specifying a UDP multicast address;
sending a point to point message to a relay node on a non-local subnet that include members of the group; and
sending a multicast message from the relay node on the non-local subnets to other members on the non-local subnet.

22. The method of claim 21 wherein the step of sending a point to point message to a relay node comprises sending a point to point UDP message specifying the IP address of the relay node, and wherein the step of sending a multicast message from the relay node on the non-local subnets to other members on the non-local subnet comprises sending a UDP/IP multicast message specifying the UDP multicast address.

23. The method of claim 21 further comprising the step of sending an acknowledgment message from each group node receiving the group message to the sending node.

24. The method of claim 23 further comprising the step of waiting to send a next group message from the sending node until an acknowledgment message from each group node receiving the group message is received by the sending node.

25. The method of claim 24 wherein the step of waiting to send a next group message comprises resending messages to nodes not acknowledging receipt of the group message in a predetermined time period.

26. The method of claim 25 wherein the step of resending message to nodes not acknowledging receipt comprises sending point to point messages using an IP address of those nodes.

27. A method for sending a group message from a sending node to a specified group of nodes in a cluster, the method comprising the steps of:
enqueing the group message onto a message queue for the specified group of nodes in the cluster;
sending a multicast message to members of the specified group in a local subnet by specifying a UDP multicast address for the specified group;
sending a point to point message to a relay node on a non-local subnet that include members of the group by specifying an IP address of the relay node;
sending a multicast message from the relay node on the non-local subnets to other members on the non-local subnet by specifying the UDP multicast address for the specified group;
sending an acknowledgment message to the sending node from each node in the group receiving the group message; and
waiting to send a next group message from the sending queue until the acknowledgment message from each group node is received by the sending node.

28. The method of claim 27 further comprising the step of each node in the specified group of nodes checking a sequence parameter indicating whether the group message has been previously received and delivering the group message to a client if the group message has not been previously received.

29. The method of claim 28 wherein the sequence parameter indicates a corresponding sending queue.

30. The method of claim 27 wherein the step of sending a multicast message comprises sending a UDP multicast message to a UDP multicast address.

31. The method of claim 27 further comprising the step of inserting a point to point message to one node on the cluster onto the message queue for the specified group of nodes in the cluster to allow the point to point message to be delivered in a desired order with respect to group messages to the specified group.

32. The method of claim 27 wherein the step of sending a point to point message to a relay node on a non-local subnet comprises sending the point to point message through the Internet.

33. A program product comprising:
(A) a cluster communication servicer facilitating multicast cluster messaging to a plurality of other nodes in a cluster without requiring an intervening dedicated local area network to said plurality of other nodes, the cluster communication servicer including a group send mechanism for sending messages to a predefined group of nodes in the cluster, wherein the group send mechanism sends messages to the predefined group of nodes in the cluster by sending a multicast message to members of the predefined group of nodes on a local network and sending a point to point messages to a relay node for members of the predefined group of nodes in the cluster on non local networks; and
(B) signal bearing media bearing said cluster communication servicer.

34. The program product of claim 33 wherein said signal bearing media comprises transmission media.

35. The program product of claim 33 wherein said signal bearing media comprises recordable media.

36. The program product of claim 33 further comprising a cluster topology servicer including mechanisms for defining multicast groups of nodes and adding and removing nodes to the multicast groups of nodes.

37. The program product of claim 33 wherein the cluster communication servicer further includes a node send mechanism for sending messages to a specified node in the cluster.

38. The program product of claim 33 wherein the group send mechanism passes the multicast message to a UDP/IP stack using a predefined UDP multicast address, and passes the point to point message to the UDP/IP stack using an IP address of the relay node.

39. The program product of claim 33 wherein the group send mechanism waits to send a next group message until all members of the predefined group have acknowledged receipt of a previous message.

40. The program product of claim 33 wherein the cluster communication servicer further includes a plurality of node objects for receiving messages from other nodes in the cluster and delivering the received message to a client, and wherein the plurality of node objects include a plurality of receive next parameters, with each of the plurality of receive next parameters indicating a sequence number for a next message to be received for a corresponding message queue such that the plurality of node objects will not redeliver a received message that has been previously delivered by the node object.

41. The program product of claim 33 wherein the cluster communication servicer further includes a plurality of group message queues, wherein at least one of the plurality of group message queues corresponds to one of a plurality of predefined groups and orders group messages for sending to the corresponding predefined group such that group messages are sent in the order placed into the corresponding group message queue, and wherein the cluster communication servicer further includes at least one point to point message queue, wherein the point to point message queue orders point to point messages sent to individual nodes in the cluster.

42. The program product of claim 41 wherein the cluster communication servicer adds header information to each message, and wherein the header information includes a message sequence number for the corresponding message queue, a relay parameter indicating whether the message is a relay message, and a reliable parameter indicating whether acknowledgment of receipt is requested.

43. The program product of claim 33 wherein the cluster communication servicer further includes a plurality of subnet objects, with a subnet object existing for each network that includes nodes in the cluster, and wherein the subnet object includes a default address for the local network, and wherein the default address of the local network is a multicast address, and wherein the default address of a non local network is an address of a relay node on the non local network.

44. The program product of claim 43 wherein the cluster communication servicer further comprises a loopback subnet object having a default address, and wherein the default address of the loopback subnet object comprises a loopback address.

45. A program product comprising:
(A) a cluster communication servicer, said cluster communication servicer including:
a group send mechanism for sending group messages to predefined groups of nodes in a cluster, wherein the group send mechanism delivers group messages to a send queue corresponding to a specified group of nodes, the message queue sending the group message to the specified group of nodes in the cluster by sending a multicast message to members of the specified group of nodes on a local subnet and sending a point to point messages to a relay node for members of the specified group of nodes in the cluster on non local subnets; and
a plurality of node objects for receiving messages from other nodes in the cluster and delivering the received message to a client, and wherein the plurality of node objects include a plurality of receive next parameters, with each of the plurality of receive next parameters indicating a sequence number for a next message to be received for a corresponding message queue such that the plurality of node objects will not redeliver a received message that has been previously delivered by the node object; and
(C) signal bearing media bearing said cluster communication servicer.

46. The program product of claim 45 wherein the cluster communication servicer adds a header to each group message corresponding to each subnet that includes nodes in the specified group of nodes, wherein headers for local subnets include a multicast address, headers for non local subnets include an address to the relay node, and headers for loopback subnets include a loopback address.

47. The program product of claim 46 wherein the header further includes a message sequence number for the corresponding message queue, a relay parameter indicating whether the message is a relay message, and a reliable parameter indicating whether acknowledgment of receipt is requested.

48. The program product of claim 47 wherein the plurality of node objects send an acknowledgment message to a sending node when the received message requests acknowledgment.

49. The program product of claim 48 wherein the cluster communication servicer further includes a plurality of subnet objects, with a subnet object existing for each network that includes nodes in the cluster, and wherein the subnet object includes a default address for the corresponding network, and wherein the default address for a local network is a multicast address, and wherein the default address of a non local network is an address of a relay node on the non local network, and wherein the cluster communication servicer further includes a loopback subnet having a default address, and wherein the default address of a loopback subnet comprises a loopback address, and wherein each of the plurality of subnet objects tracks the receipt of acknowledgment messages to assure all members of a group have received the group message.

50. The program product of claim 45 wherein said signal bearing media comprises recordable media.

51. The program product of claim 45 wherein the group send mechanism passes the multicast message to a UDP/IP stack using a predefined UDP multicast address, and passes the point to point message to the UDP/IP stack using an IP address of the relay node.

52. The program product of claim 45 wherein the message queue waits to send a group message until any previous group messages have been acknowledged as received by all nodes in the corresponding group of nodes.

53. The program product of claim 45 wherein the cluster communication servicer further includes at least one point to point message queue, wherein the point to point message queue orders point to point messages sent to individual nodes in the cluster.

54. The program product of claim 45 wherein said signal bearing media comprises transmission media.

55. The program product of claim 45 wherein the cluster communication servicer further includes a node send mechanism for sending messages to a specified node in the cluster.

56. The program product of claim 45 wherein each of the plurality of nodes in the cluster includes the cluster communication servicer.

* * * * *